(No Model.)

J. H. GRIFFITHS.
SAW.

No. 413,753.　　　　　　Patented Oct. 29, 1889.

Attest
A. Edmunds
Carl Hayden

Inventor
James H. Griffiths
By P. J. Edmunds
Atty

United States Patent Office.

JAMES H. GRIFFITHS, OF KINGSMILL, ASSIGNOR OF ONE-HALF TO GEORGE A. TUTTLE, OF SOUTH DORCHESTER, AND DAVID A. SHERK, OF AYLMER, ONTARIO, CANADA.

SAW.

SPECIFICATION forming part of Letters Patent No. 413,753, dated October 29, 1889.

Application filed August 17, 1889. Serial No. 321,066. (No model.)

*To all whom it may concern:*

Be it known that I, JAMES H. GRIFFITHS, a subject of the Queen of Great Britain, and a resident of Kingsmill, in the Province of Ontario, Canada, have invented certain new and useful Improvements in Saws, of which the following specification, taken in connection with the accompanying drawings, forms a full, clear, and exact description.

In the manufacture of saws as ordinarily practiced the blade is toothed before it is ground and polished—that is, the material between the teeth is removed, which, particularly in large saws, forms very large openings at the toothed edge of the blade, and therefore not a proportionate amount of metal to be ground and polished at this edge to that at the back edge of the saw, so that the same grinding and polishing at the toothed edge of the saw would wear away and thin the saw more at this point than at the back edge of said saw, whereas the saw should be slightly thicker at the toothed edge, and in practice it has been found that when this material has been removed from between the teeth and the openings formed for the further gumming of the saw the edges of the teeth have not only been ground thinner than their central portion, but that a groove has been formed across the saw in a line with these openings. My improvements overcome these objections; and they consist in forming narrow transverse slots in the saw-blade, as shown in the accompanying drawings, which permit large portions of material to remain between the teeth, which are only connected with the saw by narrow arms, which permit the blocks of material to be readily and easily removed after the saw is ground and polished, as will be hereinafter more fully set forth and described, and then pointed out in the claims.

Figure 1:
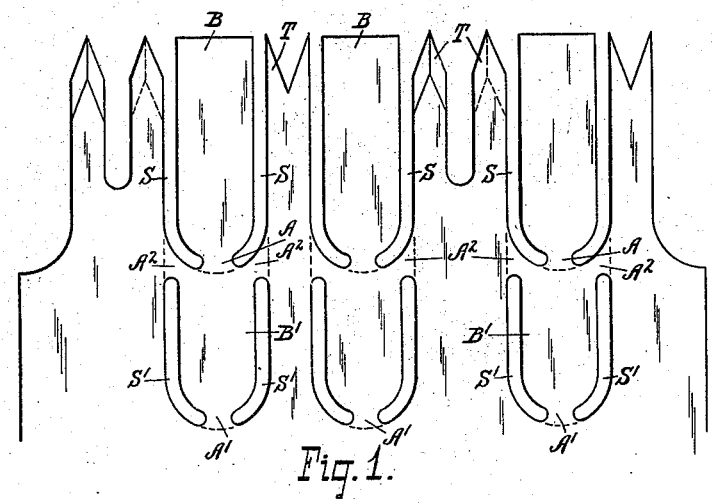
Figure 2:
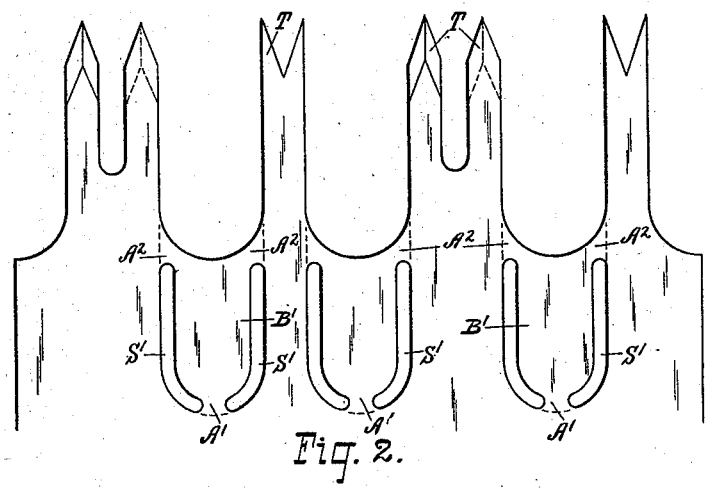

Reference being had to the accompanying drawings, already mentioned, Figure 1 is a side elevation of a portion of a saw embodying these improvements. Fig. 2 is another view of same, showing the blocks between the teeth removed.

The points of the teeth T are formed as usual, and any arrangement or combination of drag and cutting teeth may be used, as found most suitable for the circumstances for which they are required; but instead of removing all the material between the teeth I only form the narrow transverse slots S on each side of the teeth and permit the material or blocks B to remain between the teeth and in connection with the saw by the arms A, as shown in Fig. 1; and instead of forming openings in the saw, for further gumming, of an equal width with the opening between the teeth, I form the narrow transverse slots S' on a line with the edges of the teeth T and permit the material or blocks B' to remain between the slots S' and in connection with the saw-blade by the narrow arms or braces A' A². By permitting the main portion of the material or blocks B and B' to remain in place at the toothed edge of the saw and only forming the narrow slots S S' therein the grinding and polishing device has a proportionate amount of material to grind on throughout the whole length and width of the saw, and this in practice has been found sufficient to enable the saw to be ground evenly and without thinning the edges of the teeth, and without forming a groove in the blade on a line with the openings between the teeth, which has been a difficulty that great care and attention have been previously given to in order to overcome; and another advantage of this construction is that by forming the slots S' on a line with the edge of the teeth, and permitting the block B' to remain in place between these slots S', and by bracing this block B' with the saw by the arms or braces A' A², the strength of the saw constructed in this manner is greatly increased over those manufactured in the usual manner.

With my improvement, when the saw is worn down, the teeth may be lengthened by cutting through the arms A², when the blocks B' may be readily removed.

Having thus described my invention, I claim—

1. A saw-blade having the transverse slots S formed therein, substantially as and for the purpose set forth.

2. A saw-blade having the transverse slots S' formed therein, substantially as and for the purposes set forth.

3. A saw-blade having the slots S S' formed therein, substantially as and for the purpose set forth.

4. A saw-blade having the blocks B between the teeth and connected therewith by the arms A, substantially as and for the purpose set forth.

5. A saw-blade having the blocks B' connected therewith by arms A' A², substantially as and for the purposes set forth.

6. A saw-blade having the blocks B and B' connected therewith by the arms A and A' and A², respectively, substantially as and for the purposes set forth.

7. A saw-blade having the slots S S' formed therein, and the blocks B and B' connected therewith by the arms A and A' and A², respectively, substantially as and for the purposes set forth.

In testimony whereof I affix my signature in the presence of the two undersigned witnesses.

JAMES H. GRIFFITHS.

Witnesses:
P. J. EDMUNDS,
A. EDMUNDS.